(12) United States Patent
Meade

(10) Patent No.: US 7,144,003 B1
(45) Date of Patent: Dec. 5, 2006

(54) SOLDER ASSISTOR

(76) Inventor: John Meade, 1708 San Patricio Ave. SW., Albuquerque, NM (US) 87104

( * ) Notice: Subject to any disclaimer, the term of this patent is extended or adjusted under 35 U.S.C. 154(b) by 40 days.

(21) Appl. No.: 11/131,000

(22) Filed: May 17, 2005

(51) Int. Cl.
*B25B 1/20* (2006.01)

(52) U.S. Cl. .................. 269/43; 269/254 CS; 29/281.1

(58) Field of Classification Search .................. 269/43, 269/254 CS, 902, 903, 289 R, 290, 303, 269/216, 152; 29/281.1
See application file for complete search history.

(56) References Cited

U.S. PATENT DOCUMENTS 3,218,058 A * 11/1965 Smith .......................... 269/166
4,877,228 A * 10/1989 Ripert ......................... 269/156
5,048,742 A *  9/1991 Fortune ...................... 228/20.5
6,145,823 A * 11/2000 Moushon et al. ....... 269/254 R
6,439,449 B1 *  8/2002 Gelfman ..................... 228/121

* cited by examiner

*Primary Examiner*—Lee D. Wilson
(74) *Attorney, Agent, or Firm*—Dewitt M. Morgan

(57) ABSTRACT

The device of the present invention is useful for facilitating the soldering of materials. More specifically, the device of the present invention is useful for the positioning and securing of at least two electrically conductive materials such that those materials can be effectively soldered together.

7 Claims, 3 Drawing Sheets

SOLDER ASSISTOR

FIELD OF THE INVENTION

The present invention relates to the field of devices used to facilitate the electrical connection of at least two electrically conductive materials. More specifically, the present invention relates to the field of soldering devices.

BACKGROUND OF THE INVENTION

In many fields, including but not limited to the fields of general automotive electronics and audio/video electronics, it is often necessary to electrically connect at least two different wires. This connection is often achieved through the use of solder. The art of soldering requires the melting of a metallic alloy to unite at least two other metallic surfaces. In the relevant fields, solder is used to electrically connect at least two separate wires to unite those wires and facilitate the passage of electricity through those wires.

The strength of a solder connection depends on the environment in which the soldering process is conducted. It is necessary to ensure ample contact between the two surfaces for which the electrical connection is desired. This can be a difficult task as the art of soldering requires that the person soldering use both hands to complete the task. Thus, it is necessary to provide for some method of securing the at least two metallic surfaces or members desired to be soldered in a preferred position in reference to the other and ensuring that the wires will retain that preferred position throughout the soldering process.

Previous attempts to resolve the positioning and securing problem have not been adequate. One attempt used a wire end connector type mechanism which would clamp the ends of the two wire pieces desired to be soldered. This process only allowed for the soldering of the remaining exposed wire. This approach has three drawbacks. First, because the clamp was attached at the ends of the exposed wire, those portions of the wire could not be soldered. Second the wires had to be manipulated such that they were essentially perpendicular to the remainder of the wire. This results in an inefficient use of space in what can be extremely confined circumstances (such as in the dashboard or under the hood of an automobile) and also increases the potential for a breach as compared to the situation where the soldered connection remains in-line with the remainder of the wires being soldered (at least in the event of only two wires being soldered). Finally, the use of these devices did not limit the amount of solder that was applied to the exposed wire and would often result in a large hardened portion of solder. Again, this is an inefficient use of space and of solder.

Therefore, what is needed is a device which allows for all portions of exposed wires to be soldered and, in the case of two wires being connected, for the soldered connection to remain in line with the remainder of the wires.

OBJECTS OF THE INVENTION

It is one object of the present invention to provide a device for positioning and securing at least two wires such that those wires can be electrically connected to each other.

It is another object of the present invention to provide a device for electrically connecting at least two wires that can accommodate wires of different sizes.

It is yet another object of the present invention to provide a device for electrically connecting at least two wires together such that the portion of the wire being soldered remain linear with the remainder of the wire.

It is still a further object of the present invention to provide a device which allows for solder to be applied to the complete distal end of the bar portion of wires.

It is still a further object of the present invention to provide a device which allows for the removal of excess solder.

SUMMARY OF THE INVENTION

The device of the present invention is useful for securing and positioning at least two wires together such that the wires can be electrically connected. The device is comprised of clamps attached to a planar surface. Each of these clamps can be used to secure and position a wire such that all of the wires desired to be electrically connected are adjacent to each other and, in the case of two wires, retain the same linear disposition of the remainder of the wire. This allows for the user of the device to easily and efficiently electrically connect the wires, the portion being connected being limited only by the amount of wire that is exposed. Because the device both secures the wires such that they cannot be moved and positions the wires to allow for ease of electrical connection, the person conducting the soldering does not have to hold or re-position the wires during the connection process. Further, because the clamps of the device secure portions of the wire that are not to be connected to any other wire, and will position the wires such that the desired areas to be connected will not be in contact with any other surface beyond the adjacent wire(s), a complete connection can be made along the entire potential connection area. Finally, the device of the present invention will secure the wires such that excess solder can be collected and removed such that it does not aggregate onto the soldered connection.

BRIEF DESCRIPTION OF THE DRAWINGS

A complete understanding of the present invention may be obtained by reference to the accompanying drawings, when considered in conjunction with the foregoing and the subsequent detailed description, in which.

DESCRIPTION OF THE PREFERRED EMBODIMENT

Figure 1:
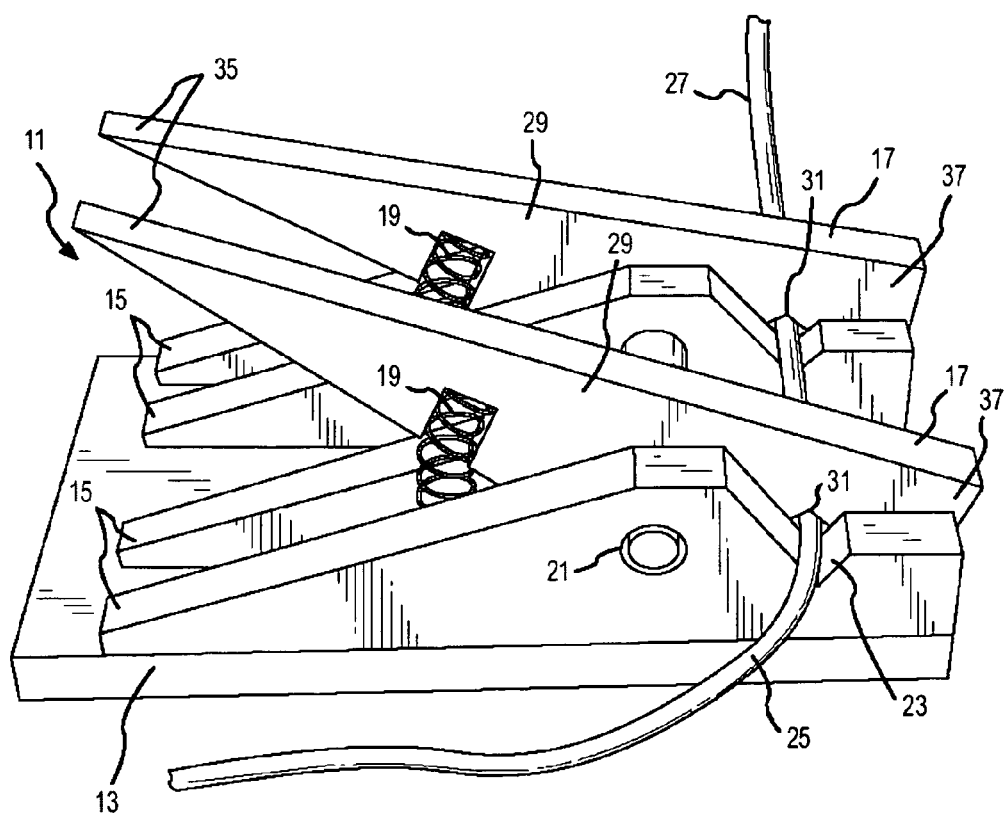
FIG. 1 is an isometric view of the device of the present invention taken from the side of the device.

With reference to FIG. 1, in one embodiment, device 11 is comprised of generally planar base section 13, receiving guides 15, securing means 17, springs 19 and fulcrum 21. Receiving guides 15, which are to be provided in matched pairs, are further comprised of trough 23 which will receive and position electrically conductive material 25. Electrically conductive material 25 can be a wire, but more generally, can be any generally cylindrical material for which a soldering process is to be applied. For ease of identification, electrically conductive material 25 will hereafter be referred to as wire 25. Once properly positioned in trough 23, wire 25 will be secured by wire securement mechanism 17 using the force applied by spring 19 transferred about fulcrum 21. Spring 19 must have a k-value which will be sufficient to secure wire 25 while not deforming wire 25 such that the exposed wire portions (shown with reference to FIG. 3) will retain the generally linear form of the wire 25. As shown in FIG. 1, there are two receiving guides 15 for each wire 25 to be connected. Accordingly, as two wires, 25 and 27 are shown, there are four receiving guides 15 in total. For ease of description, two receiving guides 15, one wire securement mechanism 17, one spring 19 and fulcrum 21 will comprise wire securing mechanism 29. Thus, there are two wire securing mechanisms 29 depicted in FIGS. 1 and 3.

Planar base section 13 serves a variety of purposes. Not only does it provide a platform onto which wire securing mechanism 29 can be mounted, but also provides a catchment for waste solder. The act of soldering generates waste solder. This waste solder, when at melting temperatures, can attain temperatures of 300° F. (the melting temperature of solder depends of the alloy composition of the solder) and is thus a hazardous material in this state. Planar base section 13 will serve to collect the waste solder such that it does not come into contact with any other component of the electrical system for which the work is being conducted or with the environment in which the soldering is being conducted. The catchment characteristic of device 11 is described with reference to FIG. 3 below.

With further reference to FIG. 1, wire securement mechanism 17 is comprised of notch 31. Notch 31 is designed with two general considerations. First, notch 31, being disposed in an angular configuration as shown, can accommodate any commercially available gauge of wire 25. Second, the angular characteristic of notch 31 will serve to contact wire 25 at at least two positions, thereby ensuring the immobility of wire 25 once engaged. This same angular configuration is carried through to trough 23, thus allowing trough 23 to also contact wire 25 at at least two points.

Figure 2:
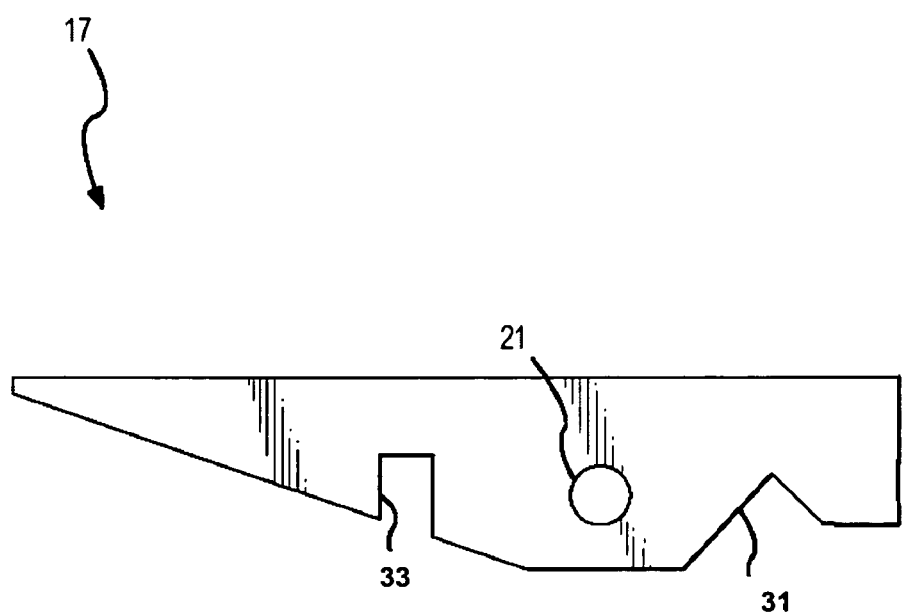
FIG. 2 is a cross section of the wire securement mechanism portion of the device of the present invention.

FIG. 2 illustrates a cross section of wire securement mechanism 17, which is comprised of wire securing notch 31, as described above, and spring receiving section 33.

Returning to FIG. 1, in operation, a user (not shown) will depress actuator portion 35 of wire securement mechanism 17 which results in securing portion 37 of wire securement mechanism 17 being rotated about fulcrum 21 into an open position and providing potential energy to spring 19. Once wire 23 has been inserted, the user (not shown) will release actuator portion 35, allowing spring 19 to return securing portion 37 to a closed position. In the closed position, wire 25 will be secured by receiving notch 31 at at least two points (e.g. the top of wire 25 and/or both sides of wire 25 depending on the gauge of wire 25 and by trough 23 of both receiving guides 15 at at least two points (e.g. the bottom of wire 25 and/or both sides of wire 25 depending on the gauge of wire 25).

Figure 3:
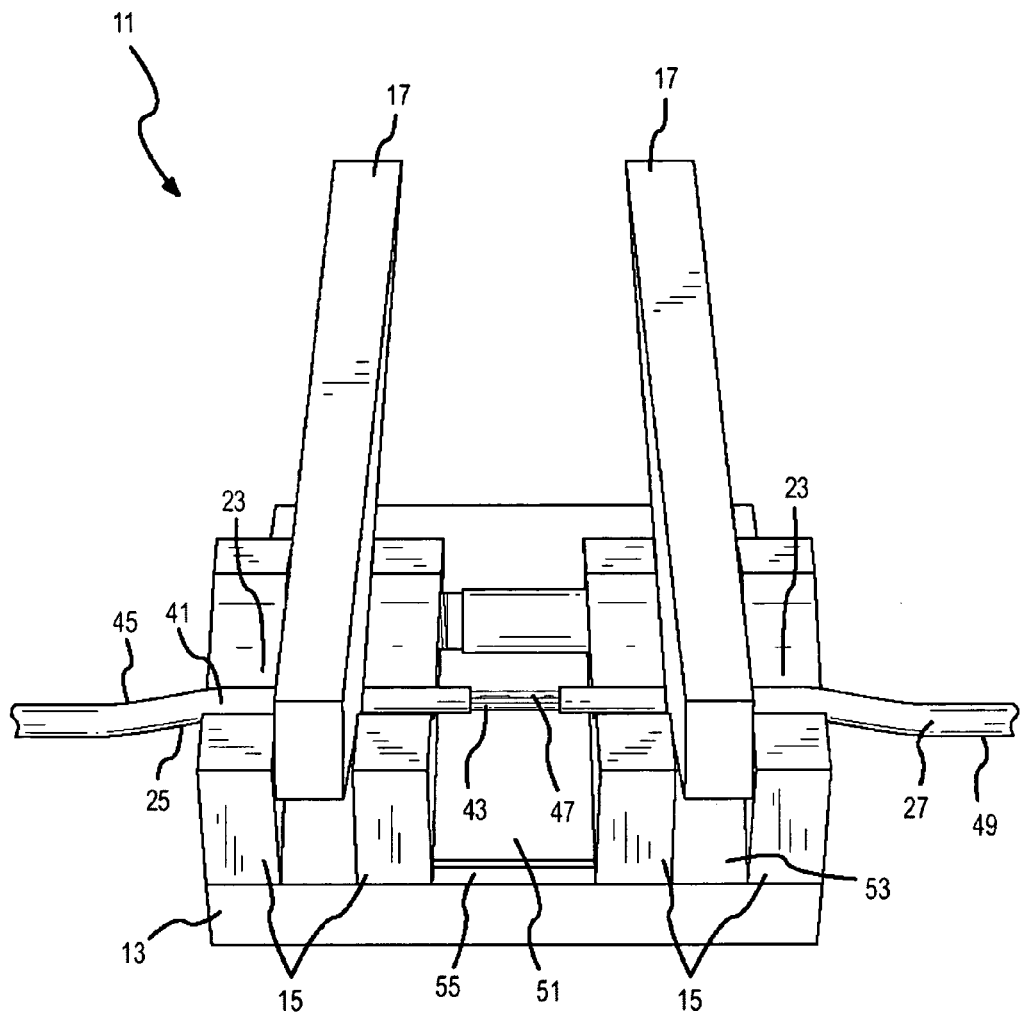
FIG. 3 is an isometric view of the device of the present invention taken from the front of the device.

FIG. 3 depicts a front isometric view of the device of the present invention. As shown in FIG. 3, wire 25 is comprised of two portions, encased portion 41 and stripped portion 43. As those skilled in the art will appreciate, wire 25 cannot be electrically connected to another wire using a soldering technique unless the protective casing 45 of encased portion 41 is stripped revealing the electrically conductive strand(s) that comprise stripped portion 43. FIG. 2 depicts the situation where wire 25 is desired to be electrically connected to wire 27. Stripped portions 43 and 47 are positioned such that they are adjacent to each other and remain linear with encased portions 41 and 49.

Further depicted in FIG. 3 is space 51. Due to troughs 23 being elevated from the top surface 53 of planar base section 13, wires 23 and 29 will also be elevated from top surface 53 of planar base section 13. This results in open space 51. Open space 51 adds the advantage of allowing complete coverage of solder (not shown) over the entire surface areas of stripped portions 43 and 47. Open space 51 also adds the advantage of allowing any waste solder to be collected away from the soldered connection so that it does not aggregate on the soldered connection. For added safety, dam 55 can be attached to top surface 53 of planar section 13 to further retain any waste solder.

Device 11 can be constructed from a variety of materials so long as device 11 maintains a lightweight attribute. Device 11 could be constructed from, but is not limited to, the following materials: wood, ceramic, aluminum, pot metal or thermal plastic. Further, the configuration of device 11 could be such that more than two wires can be simultaneously connected to each other, either by placing a plurality of wires into each trough 23 of each wire securing mechanism 29, or by abutting at least one more wire securing mechanism perpendicular to or at an angle to two other wire securing mechanisms 29.

Whereas the drawings and accompanying description have shown and described the preferred embodiments, it should be apparent to those skilled in the art that various changes may be made in the form of the invention without affecting the scope thereof.

What is claimed is:

1. A device to facilitate connecting at least two electrically conductive materials comprising:
   a. a planar lower section including a top surface;
   b. at least four means for receiving said electrically conductive materials, said receiving means being matched pairs and each of said matched pairs being used to secure one of said electrically conductive materials;
   c. at least two means for securing;
   d. said securing means being disposed between said matched pairs of receiving means;
   e. a spring disposed between each of said securing means and said planar lower section;
   f. each of said securing means being pivotally oriented about a fulcrum;
   g. said receiving means being further comprised of trough sections, said trough sections being located above said top surface of said planar lower section; and
   h. each of said securing means being further comprised of a notch section for securing one of said electrically conductive materials.

2. The device of claim 1 wherein said electrically conductive materials are wires.

3. The device of claim 1 wherein said notch section is configured angularly such that said notch section contacts said electrically conductive materials in at least two contact positions.

4. The device of claim 1 wherein said trough section is configured angularly such that said trough section contacts said electrically conductive materials in at least two contact positions.

5. The device of claim 1 further including a waste solder catchment area.

6. The device of claim 1 wherein said device is composed of heat resistant materials.

7. The device of claim 1 wherein said device is composed of lightweight materials.

* * * * *